United States Patent [19]

Takeuchi

[11] Patent Number: 4,526,089
[45] Date of Patent: Jul. 2, 1985

[54] VACUUM BOOSTER DEVICE

[75] Inventor: Hiroo Takeuchi, Asashina, Japan

[73] Assignee: Nissin Kogyo Kabushiki Kaisha, Ueda, Japan

[21] Appl. No.: 347,792

[22] Filed: Feb. 11, 1982

[30] Foreign Application Priority Data

Jul. 1, 1981 [JP] Japan .................. 56-103751

[51] Int. Cl.$^3$ .................. F01B 19/00; F15B 9/10
[52] U.S. Cl. .................. 92/98 D; 92/168; 92/169
[58] Field of Search .................. 91/369 A, 376 R; 92/98 D, 99, 165 PR, 166

[56] References Cited

U.S. PATENT DOCUMENTS

| | | | |
|---|---|---|---|
| 3,543,298 | 11/1970 | Rockwell | 91/369 A |
| 3,688,647 | 9/1972 | Kytta | 91/369 A |
| 4,245,845 | 1/1981 | Ando | 92/98 D |
| 4,325,218 | 4/1982 | Weiler | 92/98 D |
| 4,328,738 | 5/1982 | Hamamatsu | 92/99 |
| 4,334,459 | 6/1982 | Riedel | 92/166 |
| 4,398,449 | 8/1983 | Takayama | 91/369 A |
| 4,399,735 | 8/1983 | Katagiri | 91/369 B |
| 4,418,611 | 12/1983 | Tateoka | 92/169.3 |
| 4,428,274 | 1/1984 | Takeuchi et al. | 92/98 D |

Primary Examiner—Abraham Hershkovitz
Attorney, Agent, or Firm—Posnack, Roberts, Cohen & Spiecens

[57] ABSTRACT

A vacuum booster device which comprises a booster shell; a booster piston axially slidably accommodated in the booster shell and having a central boss portion and a disc portion around the outer circumference of the boss portion; and a diaphragm superposed on the rear surface of the disc portion and having an inner circumferential bead fitted to the central boss portion of the booster piston and an outer circumferential bead fitted to the circumferential wall of the booster shell. The booster piston and the diaphragm cooperate with each other to divide the interior of the booster shell into a front side first working chamber communicated with a vacuum supply source and a rear side second working chamber selectively communicated with the first working chamber or the atmosphere via a control valve operatively connected to an input member. The front and rear walls of the booster shell are connected to each other by tie rods extending through the disc portion of the booster piston and the diaphragm. Seal means are provided to through-holes of the disc portion through which the tie rods extend. The booster piston is divided into the central boss portion having a flange formed around its other circumference and the disc portion placed in contact with the rear surface of the flange, and a retainer member for clamping the disc portion and the inner circumferential bead of the diaphragm in cooperation with the flange is fixed to the outer circumference of the central boss portion.

10 Claims, 6 Drawing Figures

VACUUM BOOSTER DEVICE

BACKGROUND OF THE INVENTION

1. Field of the Invention

This invention primarily relates to a vacuum type booster device for boosting the master cylinder of hydraulic power brakes, clutch or the like of an automobile by means of a vacuum force. More specifically, the present invention relates to a vacuum type booster device of the kind in which a booster piston is axially slidably accommodated in a booster shell and a diaphragm is superposed on the rear surface of a disc portion of the booster piston, the diaphragm having an inner circumferential bead connected to the booster piston and an outer circumferential bead connected to the circumferential wall of the booster shell, the booster piston and diaphragm together dividing the interior of the booster shell into a front side first working chamber in communication with a vacuum supply source and a rear side second working chamber selectively in communication with the first working chamber or the atmosphere via a control valve operatively connected to an input member; the front and rear walls of the booster shell are connected to each other by tie rods extending through the disc portion of the booster piston and through the diaphragm; and seal means are provided for through-holes in the disc portion through which the tie rods extend.

2. Description of the Prior Art

The booster device as described above is used in such a manner that the rear ends of the tie rods are fixed to the vehicle body serving as the support wall and the master cylinder is fitted to the front ends of the tie rods. The booster device is, during its operation, capable of transmitting a forward thrust load, applied from the booster piston to the master cylinder, to the support wall via the tie rods and is thus capable of preventing the load from acting upon the booster shell. Accordingly, the booster device of this kind has the advantage that the booster shell need not have such a high rigidity as to withstand the load and so can be formed from thin steel sheet, synthetic resin or the like material, thereby reducing the total weight of the booster device.

SUMMARY OF THE INVENTION

The present invention seeks to further reduce the weight of the booster device of the above-described kind and to improve its productivity. More specifically, the present invention has for its object the provision of a booster device in which a booster piston is divided into a central boss portion and a disc portion so that the disc portion can be formed of thin steel sheet or the like having relatively high rigidity and booster pistons required by various kinds of booster devices having different capacities can be easily obtained by replacing the disc portion with another one having a different outer diameter, and in which the replaceable disc portion can easily and reliably be connected to the central boss portion together with a diaphragm without interfering with the tie rods.

To accomplish the abovementioned object, the present invention provides an improved vacuum booster device comprising a booster shell; a booster piston axially slidably accommodated in the booster shell and having a central boss portion and a disc portion around the outer circumferences of the central boss portion; a diaphragm superposed on the rear surface of the disc portion of the booster piston and having an inner circumferential bead fitted to the central boss portion and an outer circumferential bead connected to the circumferential wall of the booster shell; the booster piston and the diaphragm together dividing the interior of the booster shell into a front side first working chamber in communication with a vacuum supply source and a rear side second working chamber selectively in communicated with the first working chamber or the atmosphere via a control valve operatively connected to an input member; tie rods extending through the disc portion of the booster piston and the diaphragm for connecting the front and rear walls of the booster shell to each other; and seal means for the through-holes of the disc portion through which the tie rods extend; the improvement wherein the booster piston is divided into the central boss portion having a flange protruded around its outer circumference and the disc portion coming into contact with the rear surface of the flange, and a retainer member clamping the disc portion to the inner circumferential bead of the diaphragm in cooperation with the flange fixed to the outer circumference of the central boss portion.

The above and other objects, features and advantages of the present invention will become more apparent from the following detailed description of a preferred embodiment in conjunction with the accompanying drawings.

DESCRIPTION OF THE PREFERRED EMBODIMENT

Figure 1:
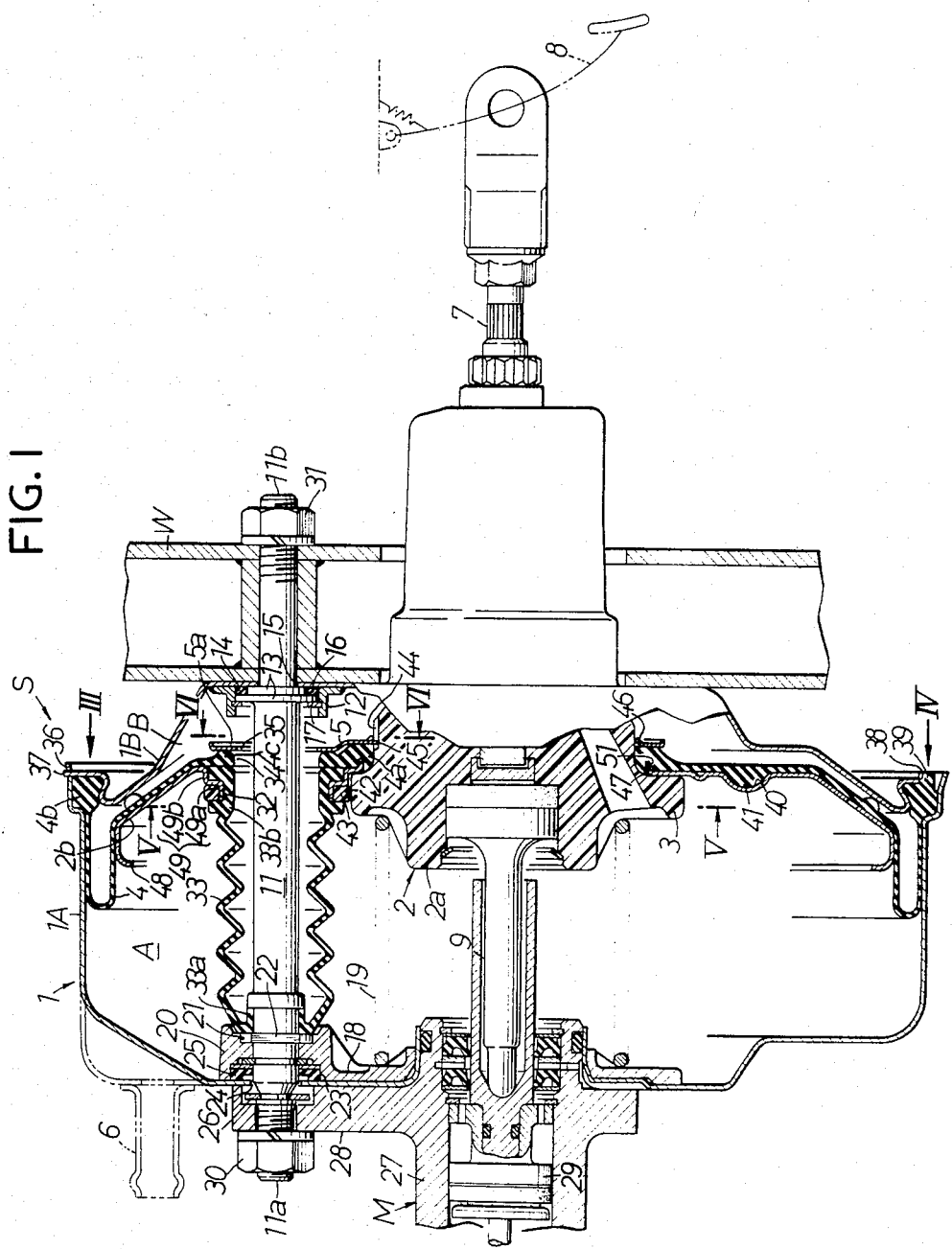
FIG. 1 is a longitudinal sectional view of a vacuum booster device in accordance with an embodiment of the present invention.
Figure 2:
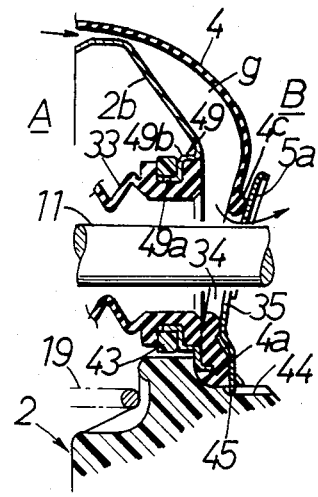
FIG. 2 is a schematic view showing the operation of the principal portions of FIG. 1.

Hereinafter, a preferred embodiment of the present invention will be described with reference to the accompanying drawings. In FIG. 1, support wall W forms a rear side wall of an engine compartment of an automobile, and a vacuum booster device S having a brake master cylinder M fitted to its front end is mounted on the front surface of the support wall.

A booster shell 1 of the booster device S includes a front shell 1A and a rear shell 1B that are divided in the axial direction and formed of thin sheet steel or synthetic resin. A booster piston 2 is incorporated in the booster shell 1 in an axially slidable manner and includes a central boss portion 2a of a synthetic resin and a disc portion 2b of a sheet steel that comes into contact with the rear surface of flange 3 formed integrally with the outer circumference of the boss portion 2a so as to protrude therefrom. The disc portion 2b has an annular anchor projection 47 formed by bending the inner circumferential edge of the disc portion rearwardly, a curl portion 48 formed by bending the outer circumferential edge of the disc portion inwardly so as to avoid contact with a diaphragm 4 (described below) and arcuate reinforcing ribs 50 each of which protrudes from a portion other than the portion of a short cylinder 49 (described below) and extends along the outer circumferential surface of the flange 3.

A rolling diaphragm 4, which is to be superposed on the rear surface of the disc portion 2b, has integral beads 4a and 4b around its inner and outer circumferential portions. The inner circumferential bead 4a has an annular anchor groove 51 on its front surface and is tightly fitted to the outer circumference of the central boss portion 2a to come into intimate contact with the rear surface of the flange 3 while the anchor projection 47 engages with the anchor groove 51. In this manner, the inner circumferential bead 4a ensures air-tightness at its inner circumferential surface as well as at its front surface and is restricted by the anchor projection 47 from radial expansion. On the other hand, the outer circumferential bead 4b is interposed between the butting end portions of the front and rear shells 1A and 1B.

An annular retainer member 5 made as a steel leaf spring is fitted on the outer circumferential surface of the central boss portion 2a via an anchor pawl 46 which is formed intergrally with the retainer member 5. The retainer member 5 clamps the disc portion 2b and the inner circumferential bead 4a in cooperation with the flange 3 of the central boss portion 2a therebetween.

The booster piston 2 and the diaphragm 4 together divide the interior of the booster shell 1 into a front side first working chamber A and a rear side second working chamber B. The first working chamber A is constantly in communication with an intake manifold (not shown) of the engine as the vacuum source via a vacuum inlet pipe 6 while the second working chamber B is alternately placed in communication with the first working chamber A or the atmosphere by means of a control valve which is actuated by the forward and rearward movement of an input rod 7 (the control valve not being shown in the drawing).

When the input rod 7 is, while the first working chamber A stores the vacuum pressure therein, moved forward by the operation of a brake pedal 8 so as to communicate the second working chamber B with the atmosphere, a propelling force is applied to the booster piston 2 due to the pressure difference produced between the working chambers A and B to advance the booster piston 2, thereby driving the operation piston 29 of the master cylinder M forward via an output rod 9.

Two (or more) tie rods 11 (see FIG. 5) penetrate through the end walls of the front and rear shells 1A, 1B, the disc portion 2b of the booster piston 2 and the diaphragm 4 in such a manner as to extend parallel to the axes of these members and with the axes interposed therebetween.

Support cylinders 12, through which the tie rods 11 penetrate, are welded to the inner surface of the end wall of the rear shell 1B, and each of the support cylinders 12 has a stepped flange 13 fitted thereto, which is formed integrally with and protrusively from the outer circumference of the tie rod 11. In this case, a seal member 16 for sealing a tie rod through-hole 15 of the rear shell 1B is fitted into an annular housing 14 defined by the stepped flange 13, the support cylinder 12 and the end wall of the rear shell 1B. A stop ring 17 is anchored to the inner circumferential wall of the support cylinder 12 for clamping a larger diameter portion of the stepped flange 13 in cooperation with the seal member 16. Thus, the tie rod 11 is fixed to the end wall of the rear shell 1B.

A clamp plate 18 is superposed on the inner surface of the end wall of the front shell 1A and supports the fixed end of a return spring 19 that urges the booster piston 2 backward. A pair of bosses 20 (only one being shown in the drawings) are integrally formed at both ends of the clamp plate 18, and two tie rods 11 penetrate through these bosses 20, preventing the clamp plate 18 from rotating. A notched circular hole 21 is formed on the inner end surface of each boss 20 and a notched circular flange 22 is formed on the tie rod 11 correspondingly to the boss 20 and is fitted into the hole 21, thereby stopping rotation of that tie rod 11. A seal housing 23 is defined on the outer end surface of each boss 20 and a seal member 25 for sealing the tie rod through-hole 24 of the front shell 1A is fitted into this housing 23.

Each tie rod 11 has both end portions threaded to form bolts 11a and 11b, which project forwardly and rearwardly of the booster shell 1. A circlip 26 is fitted to the base portion of the front bolt 11a for preventing the front shell 1A from falling. The bolt 11a penetrates through a fitting flange 28 formed at the rear end of the cylinder main body 27 of the master cylinder M and a nut 30 is screwed at the tip of the bolt 11a. In this manner, the master cylinder M is mounted to the front surface of the booster shell 1 via the tie rods 11 and at the same time, clamps and reinforces the end wall of the front shell 1A in cooperation with the clamp plate 18. The front and rear shells 1A and 1B are thus integrally coupled by tie rods 11.

The rear bolt 11b penetrates through the support wall W and is screwed at its tip with a nut 31 so as to fix the booster shell 1 to the support wall W via the tie rods 11.

A through-hole 32 of the disc portion 2b, through which the tie rod 11 penetrates, is defined by a stepped short cylinder 49 that is formed integrally with and protrusively from the front surface of the disc portion 2b. The short cylinder 49 reinforces the portion around the through-hole 32 of the disc portion 2b. A protective ring 43 formed of a synthetic resin and having substantially the same outer diameter as that of a larger diameter portion 49b of the short cylinder 49 is fitted to a smaller diameter portion 49a of the short cylinder 49. The front surface of the protective ring 43 protrudes forwardly from the tip of the reduced diameter portion 49a of the short cylinder 49, serving to prevent the rear fitting portion 33b of flexible bellows 33 from being damaged by the tip end of the smaller diameter portion 49a. The flexible bellows 33 is fitted to the through-hole 32 and will be described in detail later.

The following sealing means are applied to the two through-holes 32 of the disc portion 2b through which the two tie rods 11 penetrate, respectively.

Namely, each tie rod 11 is encompassed in the flexible bellows 33 inside the first working chamber A, and the front fitting portion 33a of the bellows 33 is tightly fitted to the outer circumference of the tie rod 11 with the rear fitting portion 33b being likewise fitted tightly to the short cylinder 49 and to the protective ring 43. Accordingly, the bellows 33 seals the through-hole 32 without hindering the movement of the booster piston 2.

Figure 6:
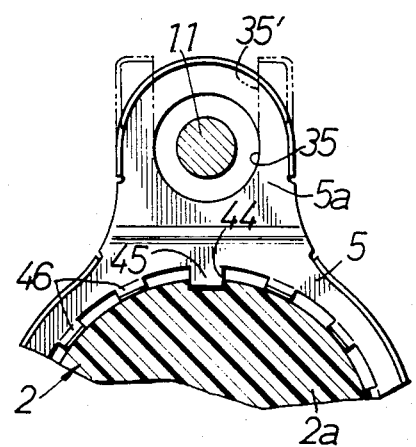
FIGS. 5 and 6 are sectional views taken along lines V—V and VI—VI in FIG. 1, respectively.

The superposed surfaces of the disc portion 2b of the booster piston 2 and the diaphragm 4 are separable from each other except for the portion of the inner circumferential bead 4a, and the gap between these superposed surfaces communicates with the second working chamber B via the through-hole 34 of the diaphragm 4 through which the tie rod 11 penetrates. The through-hole 34 is defined by the integral annular bead 4c of the diaphragm 4, which annular bead 4c detachably comes into intimate contact with the rear surface of the rear end 33b of the bellows 33. In order to normally insure this state of intimate contact, a resilient push plate 5a extending integrally from the outer circumference of the retainer member 5 is brought into pressure contact with the rear surface of the annular bead 4c. The push plate 5a is provided with an opening, which is shown in FIG. 6 in solid lines as a round hole 35 but which may be a U-shaped slit 35' as shown in dotted outline, for permitting communication between the through-hole 34 and the second working chamber B.

Engaging portions in the concavo-convex arrangement are disposed in the following manner between the front shell 1A and rear shell 1B of the booster shell 1, between the rear shell 1B and the diaphragm 4, between the diaphragm 4 and the disc portion 2b of the booster piston 2, between the disc portion 2b and the central boss portion 2a and between the cenrtral boss portion 2a and the retainer member 5 in order to concentrically arrange the through-holes 32 of the disc portion 2b, the through-hole 34 of the diaphragm 4 and the opening 35 (or 35') of the push plate 5a with respect to the tie rods 11. These engaging portions also determine the relative positions of these corresponding members in the circumferential direction.

Figure 3:
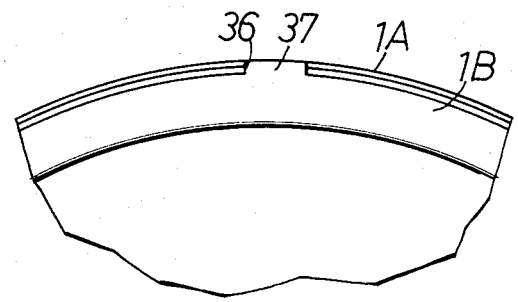
FIGS. 3 and 4 are partially schematic views as viewed in the directions indicated by arrows III and IV in FIG. 1, respectively.
Figure 4:
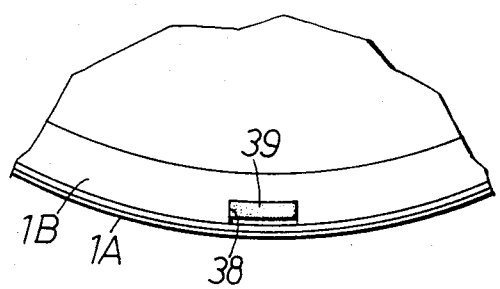
Figure 5:
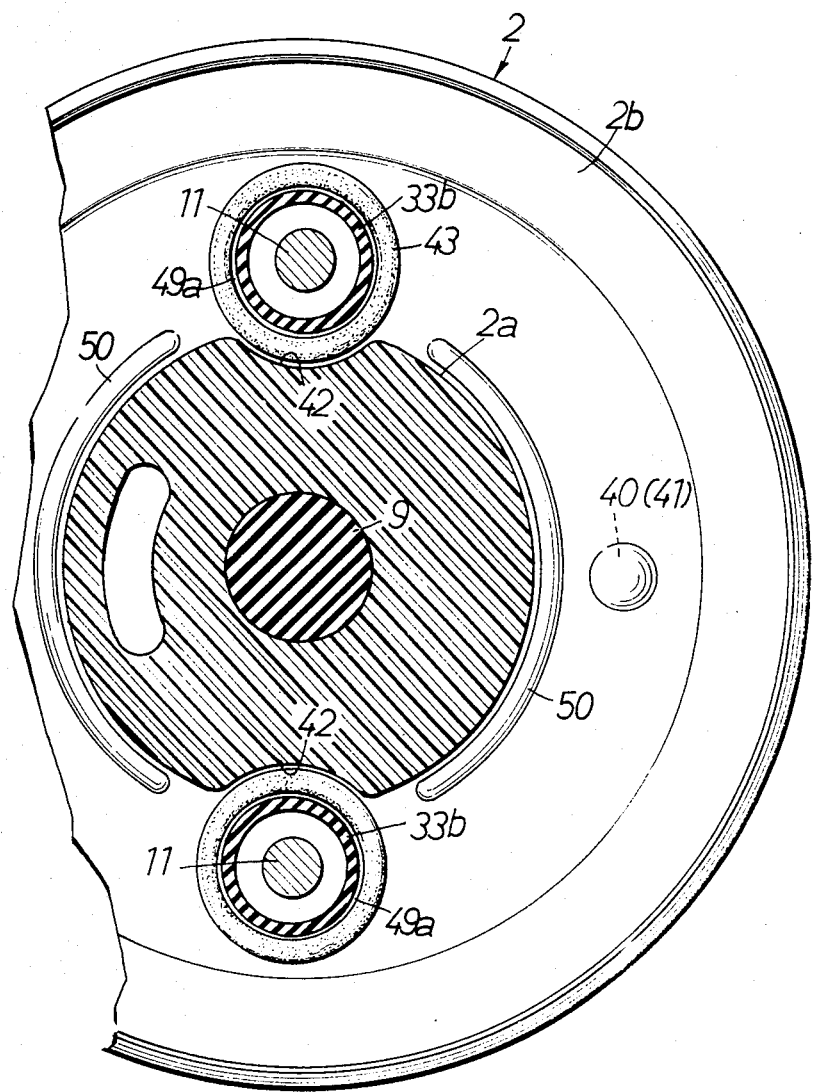

Namely, as shown in FIG. 3, a locating slit 36 and a locating pawl 37 engaging with each other are disposed at the connecting end portions between the front and rear shells 1A, 1B, and as shown in FIG. 4, a locating slit 38 and a locating protuberance 39 engaging with each other are disposed at the connecting portions between the rear shell 1B and the outer circumferential bead 4b of the diaphragm 4. Furthermore, as shown in FIG. 1, a locating recess 40, and a locating protuberance 41 engaging with each other are disposed on the superposing surfaces of the disc portion 2b and the diaphragm 4. Two arcuate locating slits 42 are symmetrically disposed in the form of grooves in the outer circumference of the flange 3 of the central boss portion 2a so as to interpose the central axis of the boss between them as shown in FIG. 5. The aforementioned two short cylinders 49 and protective ring 43 of the disc portion 2b are fitted in these slits 42. In addition, a locating groove 44 and a locating pawl 45 engaging with each other are disposed at the connecting portions between the central boss portion 2a and the retainer member 5, as shown in FIG. 6, said retainer member therein appearing as a radical tongue.

It will now be assumed that, in the above-mentioned construction, when a strong vacuum is stored in the first working chamber A, large suction force due to the vacuum acts upon the end wall of the front shell 1A having especially low rigidity. In this case, the suction force is transmitted to and supported by the support wall W via the clamp plate 18 and the tie rods 11 and moreover, the end wall of the front shell 1A is interposed and reinforced by the clamp plate 18 and the fitting flange 28 of the master cylinder M so that the end wall is never deformed inwardly. Since the clamp plate 18 supports the fixed end of the return spring 19, it also transmits the resilient force of the return spring 19 to the tie rods 11 and prevents the front shell 1A from resisting the resilient force.

When the booster piston 2 is moved forwardly by the advancing of the input rod 7 through the brake pedal 8, it pushes the operation piston 29 of the master cylinder M forwardly, thereby generating oil pressure inside an oil pressure chamber and thus actuating the wheel brake. In this case, the forward pushing force of the operation piston 29 acts upon the cylinder main body 27 of the master cylinder M as a forward thrust load via the oil pressure, but this load is transmitted to and supported by the support wall W via the fitting flange 28 and the tie rods 11. Accordingly, the booster shell 1 does not bear the load and thus does not undergo any deformation due to the load.

Next, when there is no vacuum in the vacuum source and hence, when no vacuum is stored in the first working chamber A, if the booster piston 2 is moved forwardly by the advance of the input rod 7, the second working chamber B is disconnected from the first working chamber A by a control valve and is communicated with the atmosphere, so that the air inside the first working chamber A is compressed and about to be discharged from the vacuum inlet pipe 6 towards the vacuum source. However, when the pressure inside the chamber B exceeds a predetermined level due to the discharge resistance, the compressed air flows into the gap between the superposed surfaces of the disc portion 2b of the booster piston 2 and the diaphragm 4 to define a gap g there and separate the annular bead 4c away from the rear end fitting portion 33b of the bellows 33 against the resilient push force of the push plate 5a. As a result, the air inside the first working chamber A is easily discharged into the second working chamber B under the atmospheric pressure through the gap g and the through-hole 34, so that there is hardly any discharge resistance of the air inside the first working chamber A and the booster piston 2 can be lightly operated manually.

In accordance with the present invention as has been described above, the booster piston is divided into the central boss portion having the flange protrusively formed around its outer circumference and the disc portion coming into contact with the rear surface of the flange. With this arrangement, the disc portion can be made of a thin sheet steel or the like material having relatively high rigidity so that the weight of the booster piston can be further reduced to eventually reduce the total weight of the booster device. If the disc portion is replaced by another one having a different outer diameter, booster pistons required by various kinds of booster devices having different capacities can be easily obtained. Consequently, since the central boss portion having a relatively complicated structure can be used commonly for various sizes of booster devices, these devices having different capacities can be produced at a low cost and with high productivity.

The retainer member for clamping the disc portion and the inner circumferential bead of the diaphragm in cooperation with the flange is fixed to the central boss portion and the resilient push member for pushing the peripheral portion of the diaphragm through-hole, through which the tie rods penetrate, to the disc portion is integrally formed with the retainer member. This arrangement makes it possible to fix the disc portion and the diaphragm to the central boss portion and to seal the through-hole of the diaphragm by a single component, thus simplifying the construction.

The engaging portions in the convaco-convex arrangement are disposed on the flange, the disc portion, the diaphragm, the central boss portion and the retainer member in order to determine their relative positions in the circumferential direction, and the through-hole of the disc portion, the through-hole of the diaphragm and the opening of the resilient push plate, through which the tie rods penetrate, respectively, are disposed substantially concentrically. Therefore, the replaceable disc portion can be easily and reliably connected to the central boss portion together with the diaphragm without interfering with the tie rods, thus facilitating the assembling process of the device.

On the other hand, the through-hole of the disc portion which the tie rod extends through is defined by the short cylinder that integrally protrudes from the front surface of the disc portion, and this short cylinder is engaged with the locating slit disposed on the outer circumferential surface of the flange so that the through-hole of the disc portion can be reinforced and the relative positions of the central boss portion and the disc portion in the circumferential direction can be determined. In addition, the construction is simple. In this case, if at least two or more short cylinders and locating slits are symmetrically disposed interposing the central axis of the booster piston between them, the concentric arrangement of the central boss portion and the disc portion can be simultaneously secured.

Since the retainer plate that clamps the disc portion and the inner circumferential bead of the diaphragm anchored to the disc portion in cooperation with the flange is fixed to the central boss portion, it becomes possible to reliably couple the central boss portion, the disc portion and the inner circumferential bead of the diaphragm by using one retainer plate and thus to simplify the construction. This arrangement also makes it possible to restrict elongation of the inner circumferential bead in the circumferential direction even when a large pressure difference occurs between the first and second working chambers and to prevent the vacuum from leaking from the first working chamber to the second working chamber.

While a preferred embodiment has been described, variations thereto will occur to those skilled in the art within the scope of the present invention concepts which are delineated by the following claims.

What is claimed is:

1. In an improved vacuum booster device comprising:
   a booster shell;
   a booster piston axially slidably accommodated in said booster shell and having a central boos portion and a disc portion around the outer circumference of said central boss portion;
   a diaphragm superposed on the rear surface of said disc portion of said booster piston and having an inner circumferential bead fitted to said central boss portion and an outer circumferential bead fitted to the circumferential wall of said booster shell;
   said booster piston and said diaphragm together dividing the interior of said booster shell into a front side first working chamber in communication with a vacuum supply source and a rear side second working chamber selectively in communication with said first working chamber or the atmosphere via a control valve operatively connected to an input member;
   tie rods extending through through-holes provided in said disc portion of said booster piston and through-holes provided in said diaphragm for connection of the front and rear walls of said booster shell with each other; and
   seal means for the through-holes in said disc portion through which said tie rods extend;
   the improvement wherein said booster piston is divided into the central boss portion having a flange protrusively around the outer circumference thereof and the disc portion which is separate from the central boss portion and is placed in contact with the rear surface of said flange, a retainer member is secured to the outer circumference of said central boss portion and clamps said disc portion and said inner circumferential bead of said diaphragm between said flange and said retainer member, and a resilient push plate is integrally formed with said retainer member and presses the diaphragm in a peripheral portion thereof around each said through-hole in the diaphragm against said disc portion, said disc portion having a front surface and including short cylindrical portions formed integrally with said disc portion and projecting from said front surface thereof, each said short cylindrical portion forming a respective said through-hole of said disc portion and being engaged with a respective locating slit provided at the outer circumferential surface of said flange.

2. A device as set forth in claim 1, wherein said flange, said disc portion, said diaphragm, said central boss portion and said retainer member include engaging portions arranged in a concavo-convex manner for determining their relative positions in the circumferential direction; and said through-holes of said disc portion, said through-holes of said diaphragm and openings provided in said resilient push plate, through which said tie rods respectively penetrate, are disposed substantially concentrically with said tie rods.

3. A device as set forth in claim 1, comprising arcuate ribs disposed protrusively on the front surface of said disc portion except for the portion of said short cylindrical portion in such a manner as to extend along the outer circumferential surface of said flange.

4. A device as set forth in claim 1 wherein said retainer member includes an inner annular portion secured to said central boss portion, said resilient push plate extending radially outwards from said inner annular portion and means on said inner annular portion and said central boss portion for guiding and anchoring said retainer member on said central boss portion so that the retainer member is positioned to receive the tie rods, the latter said means comprising a projecting, locating pawl on one of said portions engageable in a slot provided in the other of said portions and anchor pawls on said one portion engaging the other said portion.

5. A device as set forth in claim 4 wherein said push plate is constituted as a radial tongue.

6. A device as set forth in claim 1 wherein said central boss portion is made from a synthetic resin material and said disc portion is made from sheet steel.

7. A device as set forth in claim 1 wherein said disc portion includes means for anchoring said disc portion to said diaphragm at said rear surface of said flange.

8. A device as set forth in claim 1, wherein each said locating slit has an arcuate shape.

9. A device as set forth in claim 1 or 5, wherein at least two of said short cylindrical portions and said locating slits are disposed symmetrically so as to interpose the central axis of said booster piston between them.

10. A device as set forth in claim 5 wherein said locating slit of arcuate shape is in the form of an arcuate groove at the outer circumferential surface of said flange, said short cylindrical portions being fitted in said grooves.

* * * * *